May 18, 1965

G. L. HAWKS 3,183,851

CONVEYOR SYSTEM

Filed March 13, 1963

INVENTOR
GORDON L. HAWKS
BY J. C. Wiessler
ATTORNEY

May 18, 1965    G. L. HAWKS    3,183,851
CONVEYOR SYSTEM
Filed March 13, 1963    5 Sheets-Sheet 5
FIG. 6
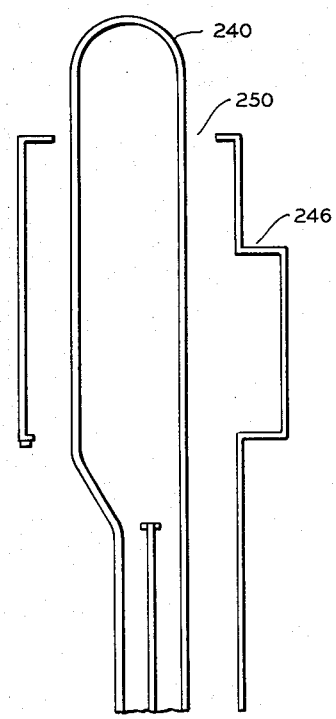
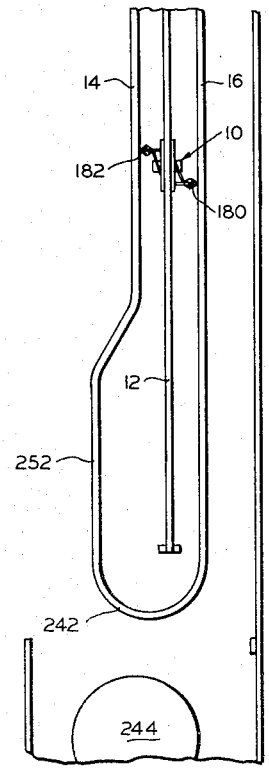
INVENTOR
GORDON L. HAWKS
BY
*J.C. Wiessler*
ATTORNEY

United States Patent Office 3,183,851
Patented May 18, 1965

3,183,851
CONVEYOR SYSTEM
Gordon L. Hawks, Battle Creek, Mich., assignor to Clark Equipment Company, a corporation of Michigan
Filed Mar. 13, 1963, Ser. No. 264,984
10 Claims. (Cl. 104—91)

The present invention relates to a conveyor system and more particularly to an overhead power and free conveyor system.

The conventional overhead conveyor for transferring products and material from one station to another in manufacturing plants generally consists of a continuous track with an endless continually moving chain which is driven at a constant speed throughout the operation of the conveyor. The chain is provided with article or material retaining devices, such as hooks or fixtures which move with the chain, whether they are loaded or unloaded, or are being loaded or unloaded. For relatively small and easily handled articles or material, this type of conveyor will perform satisfactorily and will convey these products from station to station over a relatively long distance and in a large area. While this type of conveyor is extensively used in manufacturing plants, it has been found unsatisfactory for transporting relatively large and heavy bodies and loads which are difficult or impossible to mount on and remove from a moving conveyor, and which can not conveniently be removed from the conveyor at the moment they arrive at a particular station or terminus. Further, these large and heavy bodies can not safely and satisfactorily be instantaneously accelerated for transportation by the conveyor, or transported on the conveyor throughout the length of the conveyor at a constant speed. At certain times, particularly when approaching a terminus or when leaving a work or loading station, a relatively slow speed is necessary or desirable, and at other times, when for example the bodies are moving in uncongested areas and over long distances, a relatively fast speed can be safely employed. In view of the difficulties encountered in handling and transporting the large and heavy bodies on the continuous overhead conveyors, they have frequently been handled separately and individually transported by industrial trucks, overhead cranes or dollies. It is therefore one of the principal objects of the present invention to provide an overhead intermittently operable conveyor which can be loaded with articles, bodies and material while the load supporting fixtures thereof are stationary, and which is operated only while transporting loads from one station to another and for returning the unloaded fixtures to the original station for reloading.

Another object of the invention is to provide a relatively simple versatile overhead conveyor which can readily be rearranged from time to time by lengthening, shortening or rerouting to facilitate efficient plant operational and production requirements, and which can easily be modified to add or remove work stations along the conveyor route as necessary or desirable.

Still another object of the invention is to provide a conveyor for intermittent operation which can be effectively controlled throughout the full length of the conveyor route by a control panel or device located either along the conveyor route or remove therefrom, and which will vary the speed of the articles, bodies or material being transported thereon from place to place along the conveyor route for optimum performance and maximum safety and efficiency.

A further object is to provide a reliable and inexpensive conveyor of the aforesaid type which is readily adaptable to irregular flow of products and material to and from the conveyor, and which can temporarily store or hold a load of products of material at a station ready for transportation on or for removal from the conveyor, without interfering with the normal operation of the conveyor in transporting other loads thereon.

Another object of the invention is to provide a conveyor adapted to transport relatively heavy bodies and the like from one location or station to another under power operation for rapid movement therebetween, and from other locations and in stations under manual operation for efficient handling of the bodies as one or more operations are performed thereon without removing the bodies from the conveyor.

Additional objects and advantages of the present invention will become apparent from the following description and accompanying drawings, wherein;

FIGURE 6 is a plan view of a track layout of the complete conveyor system illustrating one arrangement for which the present type of conveyor system is particularly adapted.

Figure 1:
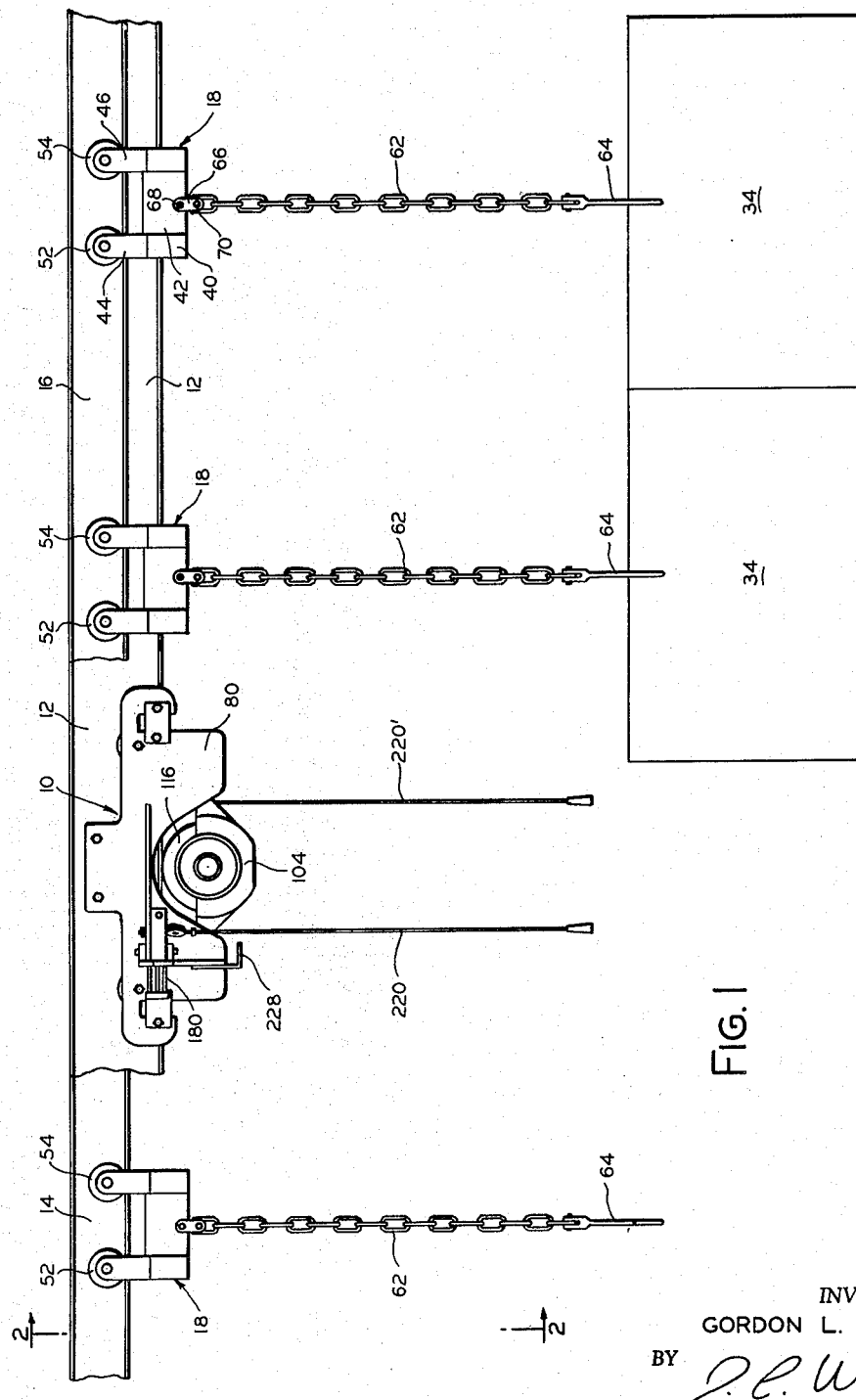
FIGURE 1 is a side elevational view of a portion of the present conveyor system showing several bodies mounted thereon preparatory to being transferred from one station to another.
Figure 2:
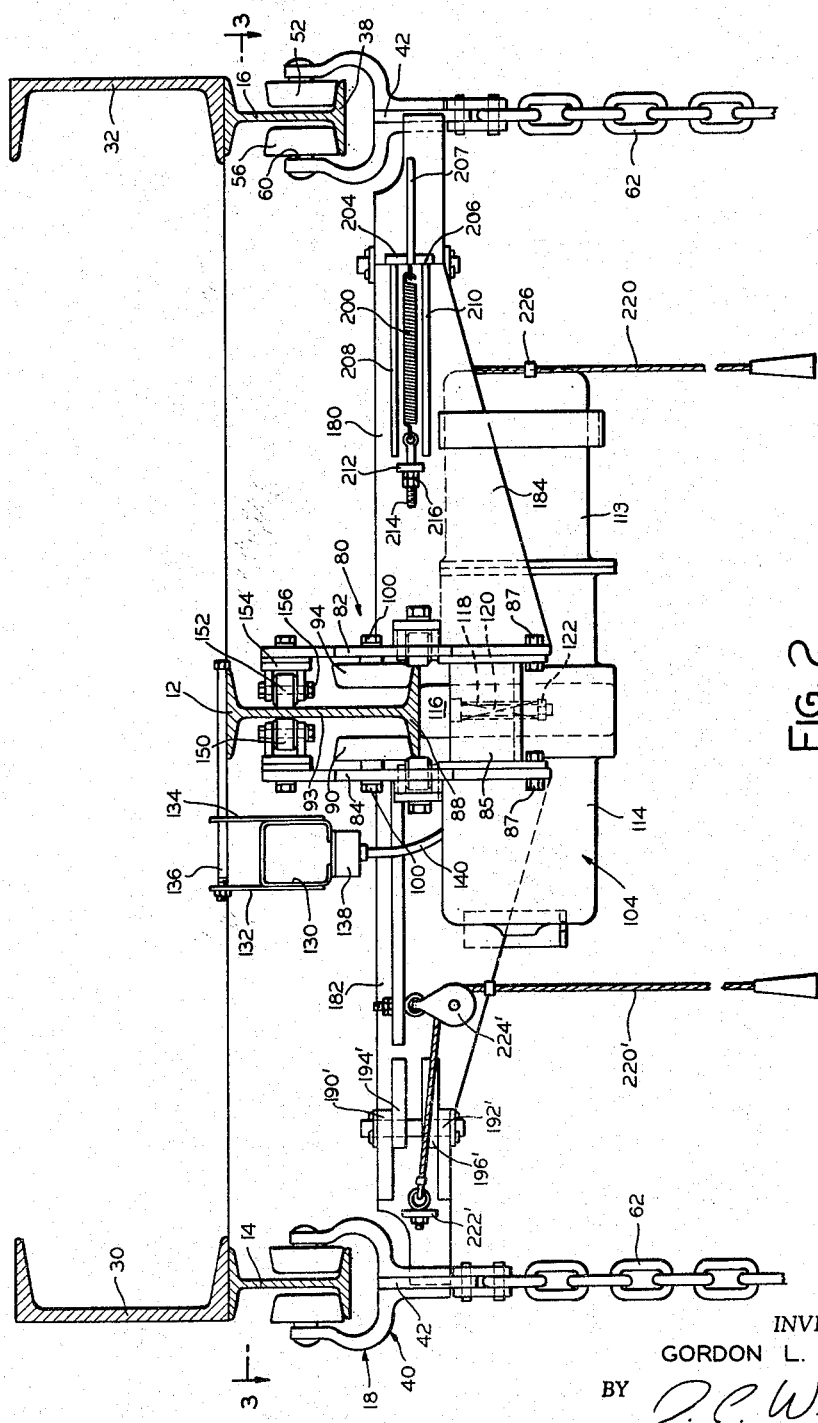
FIGURE 2 is an enlarged elevational and partial cross sectional view of the conveyor system shown in FIGURE 1, the section being taken on line 2—2 of the latter figure.
Figure 5:
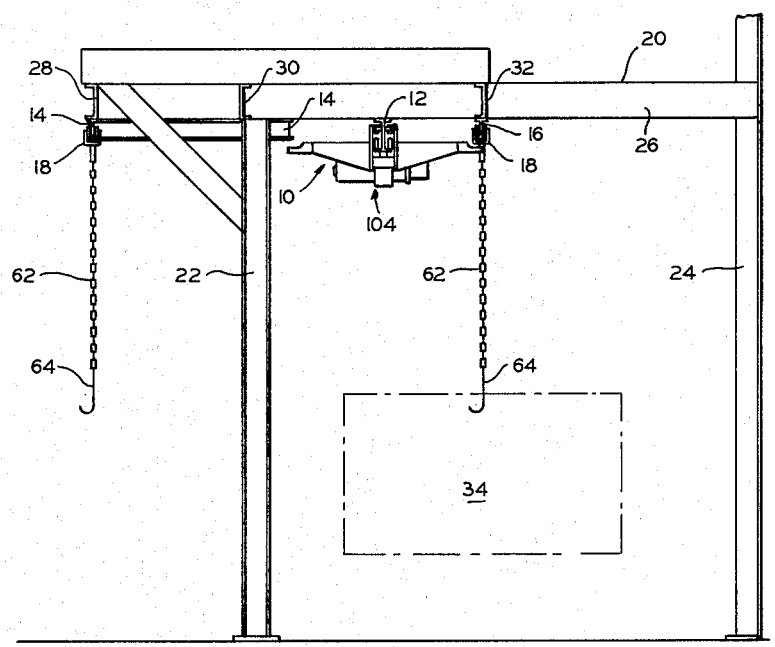
FIGURE 5 is an elevational view of the present conveyor system illustrating the manner in which the conveyor mechanism operates, and showing a body mounted thereon for delivery from one station to another station.

Referring more specifically to the drawings and to FIGURES 1 and 5 in particular, numeral 10 designates a push tractor assembly mounted on and supported by monorail 12, and numerals 14 and 16 designate monorails spaced laterally on opposite sides of monorail 12 and having mounted thereon a plurality of load carrying trolleys 18. The push tractor assembly 10 is adapted to move under its own power in either direction along monorail 12 and push trolleys 18, either loaded or unloaded, along monorails 14 and 16, as will be more fully described hereinafter. Monorails 12, 14 and 16 are supported on a suitable structure 20, such as that illustrated in FIGURE 5, consisting of a plurality of spaced vertically positioned posts 22 and 24, a plurality of horizontal overhead beams 26 supported by the posts, and channel iron beams 28, 30 and 32 for reinforcing monorails 14 and 16, these two rails being secured to the underside of the channel iron beams throughout substantially their full length, and monorail 12 being secured to spaced cross members 26 through its length. The supporting structure 20 is described herein merely for the purpose of illustrating one satisfactory means for supporting the present overhead conveyor system and is adapted to be modified and rearranged or replaced by various other types of structures to satisfy various plant production operations. In the supporting structure arrangement illustrated in FIGURE 5, posts 22 and 24 must be spaced laterally from monorail 16 sufficiently to permit the loads or bodies 34 being carried by the conveyor to pass therebetween, and post 22 must be spaced laterally from monorail 14 sufficiently to permit the unloaded trolleys 18 to pass therealong.

The two monorails 14 and 16 may be identical in size and shape and the lower flange 38 of each forms the track for trolley 18. These rails may contain any number of trolleys, and the number may be varied from time to time as production requirements change. Each trolley consists of a frame 40 having a body portion 42 and two upwardly extending arms 44 and 46 on one side of the rail and arms 48 and 50 on the other side of the rail, for rotatably supporting rollers 52, 54, 56 and 58, respectively. Four rollers engage the upper surface of lower flange 38 of monorails 14 and 16 and each is connected to the respective arm of body 42 by a shaft 60 rigidly secured to the respective arm and extending inwardly over flange 38. A chain 62 with hook 64, or other suitable load supporting fixture at its lower end, is secured to the underside of body 40 by a link 66 and pins 68 and 70 extending therethrough and through body 42 and the upper link of the chain. Trolleys 18 move freely along the monorail under the power of the tractor assembly 10, and a number of loaded trolleys may be moved simultaneously along the rail by the load of one trolley bearing against the load of the next succeeding trolley in the manner illustrated in FIGURES 1 and 3.

The tractor assembly 10 consists of a frame 80 having two side plates 82 and 84 secured to one another by cross members 85 and 86 disposed at opposite ends thereof and secured to the plates by bolts 87 to form a rigid structure. Frame 80 is mounted on lower flange 88 of monorail 12 and is supported thereon by rollers 90 and 92 on one side of the center web 93 of the rail, and 94 and 96 on the other side of the center web of the rail. Each of the four rollers is mounted on a shaft 98 extending through the respective plate 82 or 84, and rigidly secured thereto by a nut 100 threadedly received on the end of the shaft. The rollers on each side of the rail are preferably spaced a substantial distance from one another to increase the stability of the push tractor assembly as it is operated to move a load along rails 14 and 16.

A large arcuate slot 102 is provided in the lower edge of each side plate 82 and 84 to receive the tractor drive mechanism indicated generally by numeral 104, which is secured to the frame by rods 106 and 108 and fixtures 110 and 112 on each side of the drive mechanism. Since the details of the drive mechanism do not form a direct part of the present invention, the mechanism is only schematically illustrated and briefly described herein. The drive mechanism generally consists of an electrical motor 113, gear reduction unit in housing 114 and a drive wheel 116 disposed between the housing of motor 113 and gear reduction housing 114. The wheel which is so positioned with relation to these two parts as to substantially balance the weight of the drive mechanism on either side thereof, frictionally engages the undersurface of lower flange 88 of monorail 12 for propelling the tractor assembly in either direction along the monorail. The pressure of drive wheel 116 on the underside of the flange may be adjusted to optimum operating conditions by rod 118, spring 120 and adjustment nut 122 threadedly received on the lower end of rod 118. The motor of the drive mechanism is preferably a three phase, two speed type and is controlled at one or more stations spaced along the conveyor route. The electrical current for the motor is supplied through electrical conduit rail 130, of conventional and well known construction, supported by a plurality of brackets 132 and 134 secured to opposite sides of the conduit and connected to a laterally extending support member 136 which in turn is supported by rail 12. A sliding electrical contact member 138 engages the electrical contacts in the conduit rail and supplies the required power to the motor through electrical cable 140.

In order to stabilize the frame and prevent it from swaying from side to side as it moves along the monorail, stabilizing rollers 150 and 152 are mounted on the upper margin of side plates 82 and 84, each roller being supported by a bifurcated bracket 154 and shaft 156, and each fixture being secured to the respective plate by bolts 158 and 160. In some installations, it may be desirable to stabilize the frame further to prevent end-to-end sway, this being accomplished in the structure shown by two rollers 162 and 164 at opposite ends of each side of the frame. The two rollers extend through slots 166 and 168 in the respective side plates and engage the edge of flange 88, each roller being journalled on a shaft 170, which in turn is supported on the frame by a bracket 172 secured thereto by bolts 174 and 176.

Figure 3:
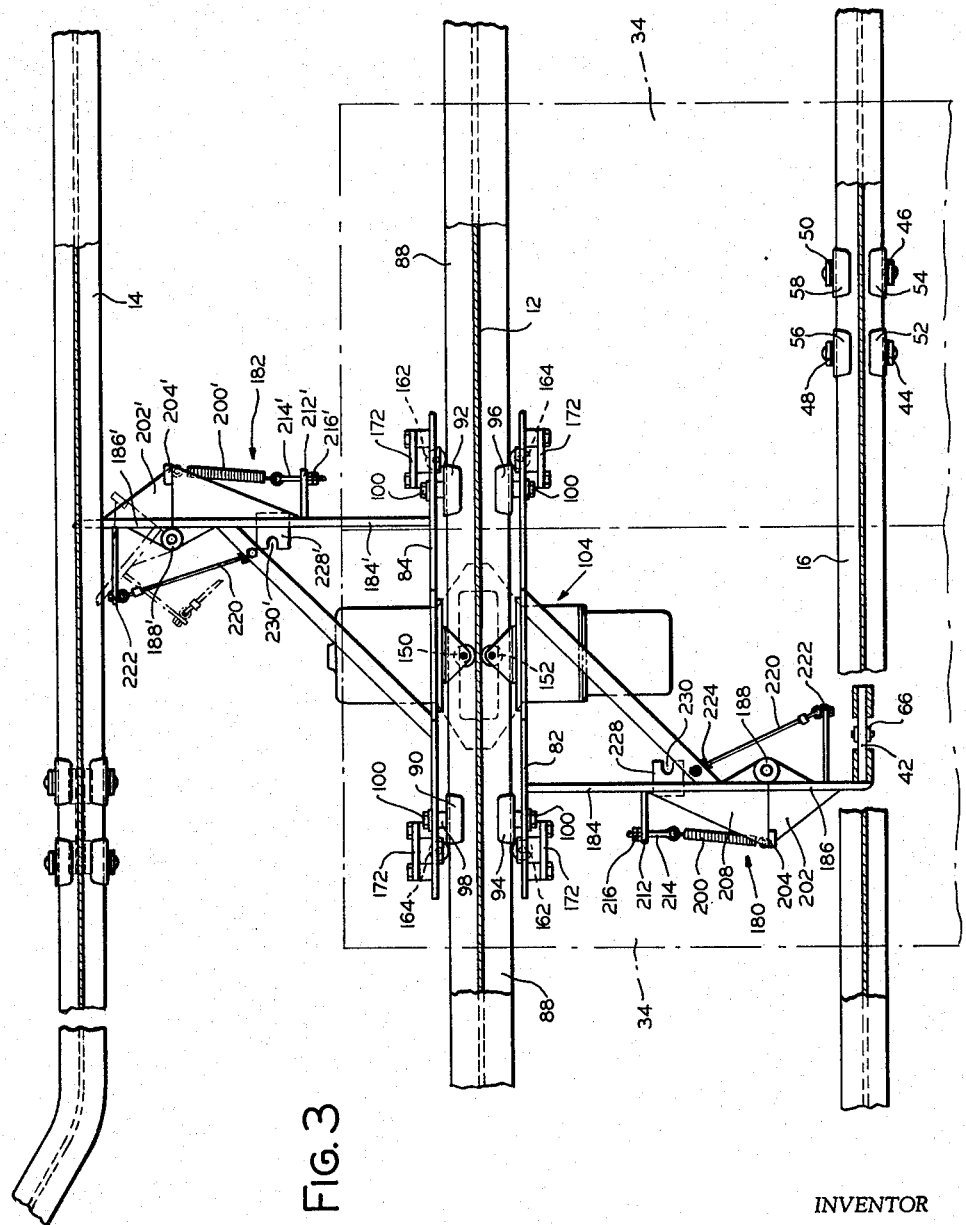
FIGURE 3 is a top plan and partial cross sectional view of the conveyor system shown in FIGURES 1 and 2, portions of the overhead rails or tracks of the conveyor system being broken away to better show the construction and operation of the mechanism.
Figure 4:
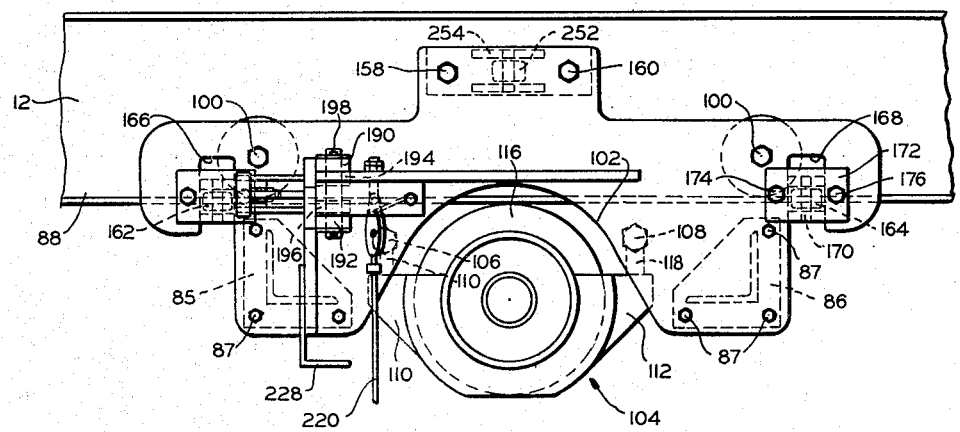
FIGURE 4 is a side elevational view of the tractor and a rail therefor, forming a part of the present conveyor system.

Trolleys 18 are pushed on monorails 14 and 16 by pusher arms 180 and 182 rigidly secured to the external surface of side plates 82 and 84 respectively, of frame 80. Since the two pusher arms are identical in construction and operation, only one will be described in detail herein, and like numerals with primes will be given to like parts in the other pusher arm. Pusher arm 180 consists of a laterally extending member 184 welded at its inner end to side plate 82 of the frame and extending laterally therefrom to a point adjacent monorail 16. Mounted on the free end of member 184 is a bar 186 pivoted at its inner end on a hinge 188 secured to member 184 and extending at the other end beneath monorail 16 for engagement with the body of one of the trolleys. The hinge 188 consists of two lugs 190 and 192 secured to arm 186, and lugs 194 and 196 secured to the free end of arm 184, and a pin 198 extending downwardly through the lugs. The bar is held in its extended position, i.e. parallel with member 184, by a spring 200 which seat lugs 204 and 206 on triangular member 207 against a pair of triangular members 208 and 210. The spring is anchored at one end to triangular member 207 and at the other end to a fixture 212, and is adjusted to vary the tension by threaded anchor pin 214 and nuts 216. It is seen that when pivot bar 186 engages trolley 18 as it is moved to the right as illustrated in FIGURE 3, the lugs 204 and 206 seat firmly against members 208 and 210, thus holding the bar rigidly in its extended position and thus transmitting the force from the tractor assembly to the trolleys on monorail 16. The pivot bar is prevented from pushing the trolleys in the opposite direction by the escapement effect provided by hinge 188 and spring 200. As the tractor assembly is moved toward the right, as seen in FIGURE 3, pivot bar 186' is pivoted inwardly by the trolley, thereby permitting the tractor to push loaded trolleys along rail 16 without moving the trolleys on rail 14. The spring imediately returns pivot bar 186' to its extended position after the bar is disengaged from the trolley. However, the pivot bar may be rendered inoperable by a pull cord 220 attached to lever 222 and extending over pulley 224 and thence downwardly where it can be reached by the operator. In the event it is desired to render the pivot arm fully inoperable for an indefinite period of time, a lug 226 on the pull cord 220 may be inserted under stop member 228 with the cord passing upwardly through U-shaped slot 230 therein.

A typical layout of the conveyor system is illustrated in FIGURE 6, wherein rails 14 and 16 are connected by curved portions 240 and 242 to form a continuous track. In the arrangement shown, a mechanism 244 for cleaning vehicle frames or other steel bodies is disposed at one end of the conveyor and a paint booth 246 is disposed adjacent the other end. As the bodies are removed from the cleaning mechanism 244, they are hung on hooks 64, and the tractor assembly pushes the trolleys on which the bodies are hung to the end of rail 12 adjacent paint booth 246. In this arrangement, rail 12 does not enter the paint booth, thus avoiding any possibility of a fire hazard from the electric motor. The operator of the paint booth moves the body manually into the paint booth where the body is sprayed, and then pushes the body outwardly through door 250 where it is removed from the hook after the paint has dried. The trolley is then moved manually along track 14 to the adjacent end of rail 12 where it is picked up by pusher arm 182 and moved along rail 14 to station 252. The trolleys are stored in station 252 until needed for transporting additional frames to the paint booth as they are removed from cleaning mechanism 244. The tractor assembly is preferably driven at two different speeds along the length of rail 12, first starting slowly at each end of the rail and moving rapidly throughout the major portion thereof and then ending at a reduced speed, thus providing a smooth and efficient start and stop of the loaded hooks and a rapid movement therebetween.

In the operation, the hooks or the trolleys on rail 16 are loaded with frames or other heavy bodies, and the operator energizes the motor of the tractor assembly, thereby causing drive wheel 116 to roll on the bottom of rail 12 and move the trolleys through push arm 180 along rail 16. A number of trolleys may be pushed simultaneously by the bodies contacting one another in the manner illustrated in FIGURES 1 and 3. Whenever arm 182 contacts a trolley on rail 14, the pivot bar moves from the position shown in full lines to the position shown in broken lines, thereby passing the trolley. After the bodies have been moved to the next station, the tractor assembly is returned in the opposite direction to its original position, pushing the empty trolleys on track 14 to station 252, for example. If desired, the trolleys may be provided with bumpers or contact members to permit one trolley to be pushed directly against the other while carrying a load without permitting the loads to contact one another.

One of the advantages of the present conveyor system isits versatility in adapting to various plant layouts and to various lengths as required for efficient production operation. Further, the tractor assembly remains inoperative and the trolleys stationary when they are not actually transporting loads, thus facilitating loading and unloading of the trolleys.

While only one embodiment of the present invention has been described in detail herein, various changes and modifications may be made to satisfy requirements without departing from the scope of the invention.

I claim:

1. In a conveyor system: a middle and two side monorail tracks, a plurality of trolleys mounted on said side monorail tracks, a tractor assembly mounted on said middle monorail track for movement in opposite direction, a pusher arm extending laterally from each side of said assembly, each of said arms having a yieldable one-way push bar pivotally mounted on the free end of each arm in close proximity to the respective side track for engagement with said trolleys, said push bars being yieldable in one direction only and in opposite directions to one another, a drive wheel mounted on said assembly beneath said middle track for driving engagement with the underside thereof, and a motor supported by said assembly for driving said drive wheel.

2. In a conveyor system: a middle and two side monorail tracks, a plurality of trolleys mounted on said said monorail tracks, a tractor assembly mounted on said middle monorail track for movement in opposite directions, a pusher arm extending laterally from each side of said assembly, a yieldable one-way push bar pivotally mounted on the free end of each arm in close proximity to the respective side track for engagement with said trolleys, said push bars being yieldable in one direction only and in opposite directions to one another, and a releasable means for retaining said bar in a retracted non-pushing position.

3. In a conveyor system: a middle and two side tracks, a plurality of trolleys mounted on said side tracks, a tractor assembly mounted on said middle track, a pusher arm extending laterally from each side of said assembly, each of said arms having a bar pivoted thereto and projecting beneath and disposed in close proximity to the respective side track for engagement with said trolleys, said bars being yieldable in one direction only and in opposite directions to one another, a stop means preventing said bar from pivoting to one side of said arm as said bar engages the trolleys, a spring means for yieldably urging said bar against said stop means, and a reversible power drive means for propelling said tractor assembly on said middle track.

4. In a conveyor system: a middle and two side tracks, a plurality of trolleys mounted on said side tracks, a tractor assembly mounted on said middle track, a yieldable one-way pusher bar pivotally connected to said assembly on each side and projecting to a point in close proximity to the respective side track for engagement with said trolleys, said pusher bars being yieldable in one direction and in opposite directions to one another, and a reversible power drive means for propelling said tractor assembly on said middle track.

5. In a conveyor system: a middle and two side I-beam monorail tracks, a plurality of trolleys mounted on said side monorail tracks, a tractor assembly mounted on said middle monorail track for movement in opposite directions, a pusher arm extending laterally from each side of said assembly each of said arms having a bar pivoted thereto and projecting beneath and disposed in close proximity to the respective side track for engagement with said trolleys, a stop means preventing said bar from pivoting to one side of said arm as said bar engages the trolleys, a spring means for yieldably urging said bar against said stop means, said bars being yieldable in one direction only and in opposite directions to one another, a drive wheel mounted on said assembly beneath said middle track for driving engagement with the underside thereof, and a motor supported by said assembly for driving said drive wheel.

6. In a conveyor system: a middle and two side I-beam monorail tracks, a plurality of trolleys mounted on said side monorail tracks, each trolley having a body extending below said tracks, a fixture connected to the body of each trolley for supporting a load, a tractor assembly mounted on said middle monorail track for movement in opposite directions and including a frame, a pair of rollers on each side of said frame for engaging the upper side of the lower flange of said middle track, a pusher arm extending laterally from each side of said frame, each of said arms having a bar pivoted thereto and projecting toward the respective side track in close proximity thereto for engagement with the bodies of said trolleys, a stop means preventing said bar from pivoting to one side of said arm as said bar engages the trolleys, a spring means for yieldably urging said bar against said stop means, a releasable means for retaining said bar in a retracted non-pushing position, said bars being yieldable in one direction only and in opposite directions to one another, a drive wheel mounted on said frame beneath said middle track for driving engagement with the undesired thereof, and a motor supported by said frame for driving said drive wheel at a plurality of predetermined speeds.

7. In a conveyor system: a middle and two side monorail tracks, a plurality of trolleys mounted on said side monorail tracks, a tractor assembly mounted on said middle monorail track for movement in opposite directions and including a frame, a pusher arm rigidly attached to and extending laterally from each side of said frame, each of said arms having a yieldable one-way push bar pivotally mounted on the free end of each arm in close proximity to the respective side track for engagement with said trolleys, said push bars being yieldable in one direction only and in opposite directions to one another, a drive wheel mounted on said frame beneath said middle track for driving engagement with the underside thereof, and a motor supported by said frame for driving said drive wheel.

8. In a conveyor system: a middle and two side monorail tracks, a plurality of trolleys mounted on said side monorail tracks, each trolley having a body extending below said tracks and a fixture for supporting a load, a tractor assembly mounted on said middle monorail track for movement in opposite directions and including a frame, opposed rollers on said frame engaging said middle track for stabilizing said assembly on said track, a pusher arm rigidly attached to and extending laterally from each side of said frame, each of said arms having a yieldable one-way push bar pivotally mounted on the free end thereof and disposed in close proximity to the respective side track for engagement with said trolleys, a releasable means for retaining said bar in a retracted non-pushing position, said push bars being yieldable in one direction only and in opposite directions to one another, a drive wheel mounted on said frame beneath said middle track for driving engagement with the underside thereof, and a motor supported by said frame for driving said drive wheel at a plurality of predetermined speeds.

9. In a conveyor system: a middle and two side I-beam monorail tracks, a plurality of trolleys mounted on said side monorail tracks, each trolley having a body extending below said tracks, a fixture including a chain and hook connected to the body of each trolley for supporting a load, a tractor assembly mounted on said middle monorail track and including a frame, a pair of rollers on each side of said assembly for engaging the upper side of the lower flange of said middle track for movement in opposite directions, opposed rollers on said frame engaging said middle track for stabilizing said assembly on said track, a pusher arm rigidly attached to and extending laterally from each side of said frame, each of said arms having a bar pivoted thereto and projecting beneath and disposed in close proximity to the respective side track for engagement with said trolleys, a stop means preventing said bar from pivoting to one side of said arm as said bar engages the trolleys, a spring means for yieldably urging said bar against said stop means, a releasable means for retaining said bar in a retracted non-pushing position, said bars being yieldable in one direction only and in opposite directions to one another, a drive wheel mounted on said frame beneath said middle track for driving engagement with the underside thereof, and a motor supported by said frame for driving said drive wheel at a plurality of pre-determined speeds.

10. In a conveyor system: a middle and two side I-beam monorail tracks spaced from one another and parallel throughout a section of their length, said side tracks having sections spaced further from said middle track than said first mentioned section forming stations, a curved track section at each end of said side tracks connecting said side tracks to form a continuous monorail track, a plurality of trolleys mounted on said side monorail tracks, each having a body extending below said tracks, a fixture including a chain and hook connected to the body of each trolley for supporting a load, a tractor assembly mounted on said middle monorail track for movement in opposite directions and including a frame with two side panels, a pair of rollers on each side of said assembly for engaging the upper side of the lower flange of said middle track, opposed rollers on said frame engaging said middle track for stabilizing said assembly on said track, a pusher arm rigidly attached to and extending laterally from each side panel, each of said arms having a bar pivoted thereto and projecting beneath and disposed in close proximity to the respective side track for engagement with the bodies of said trolleys, a stop means preventing said bar from pivoting to one side of said arm as said bar engages the trolleys, a spring means for yieldably urging said bar against said stop means, a releasable means for retaining said bar in a retracted non-pushing position, said bars being yieldable in one direction only and in opposite directions to one another, a drive wheel mounted on said frame beneath said middle track for driving engagement with the underside thereof, and a motor supported by said frame for driving said drive wheel at a plurality of predetermined speeds.

References Cited by the Examiner
UNITED STATES PATENTS

| 1,407,253 | 2/22 | Castleman | 104—162 |
| 1,573,778 | 2/26 | Beaumont | 105—154 |
| 2,575,396 | 11/51 | Schenk | 104—162 |
| 2,974,609 | 3/61 | Bent et al. | 105—153 |
| 3,074,354 | 1/63 | Wakkila | 104—93 |

FOREIGN PATENTS 1,202,902   7/59   France.

LEO QUACKENBUSH, *Primary Examiner.*

JAMES S. SHANK, *Examiner.*

UNITED STATES PATENT OFFICE
CERTIFICATE OF CORRECTION

Patent No. 3,183,851

May 18, 1965

Gordon L. Hawks

It is hereby certified that error appears in the above numbered patent requiring correction and that the said Letters Patent should read as corrected below.

Column 2, line 59, for "through" read -- throughout --; column 5, line 61, for "said", second occurrence, read -- side --; column 6, line 58, for "undesired" read -- underside --; column 7, line 27, after "track" insert -- for movement in opposite directions --; lines 29 and 30, strike out "for movement in opposite directions".

Signed and sealed this 21st day of December 1965.

(SEAL)
Attest:

ERNEST W. SWIDER
Attesting Officer

EDWARD J. BRENNER
Commissioner of Patents